Mar. 6, 1923. 1,447,565
A. NOSAN
COMBINATION MEASURING INSTRUMENT
Filed May 31, 1922 2 sheets-sheet 1

Inventor
Anton Nosan
By John A. Bomnhardt
Atty.

Mar. 6, 1923.
A. NOSAN
COMBINATION MEASURING INSTRUMENT
Filed May 31, 1922 2 sheets-sheet 2
1,447,565
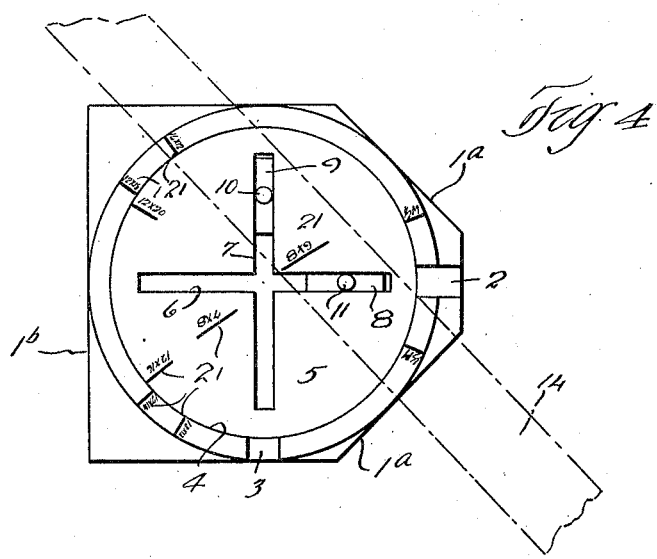
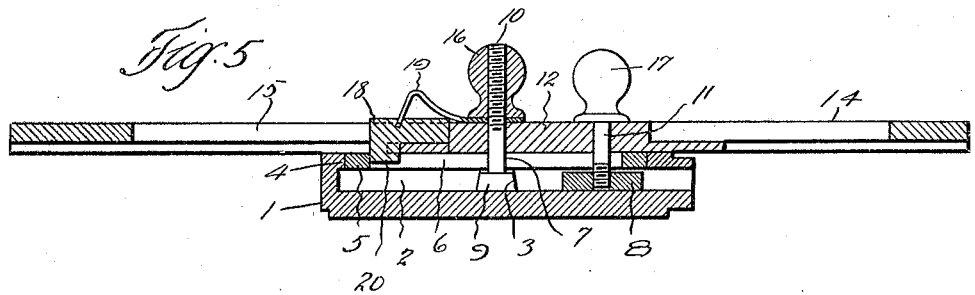
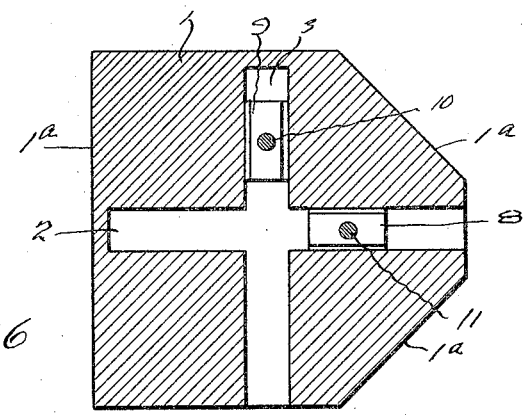
Inventor
Anton Nosan
By John A. Bommhardt
Atty.

Patented Mar. 6, 1923.

1,447,565

UNITED STATES PATENT OFFICE.

ANTON NOSAN, OF WEST PARK, OHIO.

COMBINATION MEASURING INSTRUMENT.

Application filed May 31, 1922. Serial No. 564,813.

*To all whom it may concern:*

Be it known that I, ANTON NOSAN, a subject of the Government of Yugoslavia, residing at West Park, in the county of Cuyahoga and State of Ohio, have invented certain new and useful Improvements in Combination Measuring Instruments, of which the following is a specification.

This invention relates to combination measuring instruments and is especially adapted for use by carpenters. Its principal object is to provide a gauge or device of this character which can be set for cutting different pitches such as are necessary when cutting rafters for a pitch roof, etc. It can also be set for making the mitre cuts or half mitres and can also be used as a square. Various other uses will be apparent from the following description.

Figure 1:
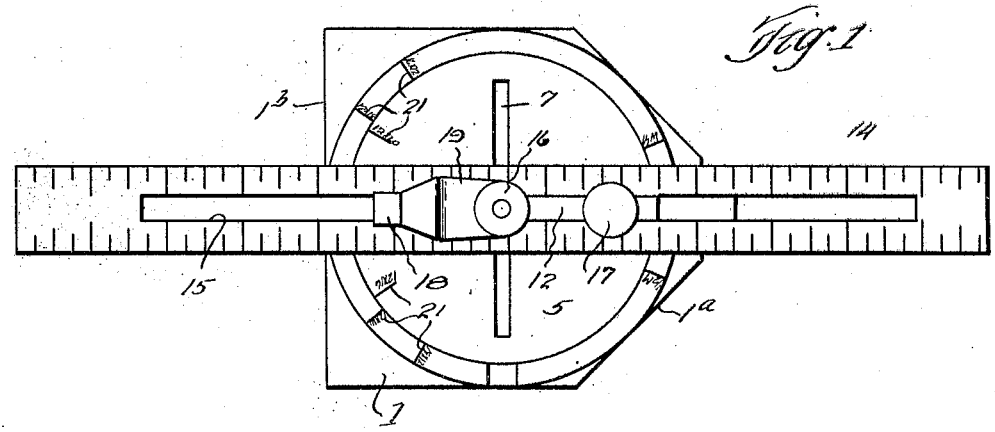
Figure 2:
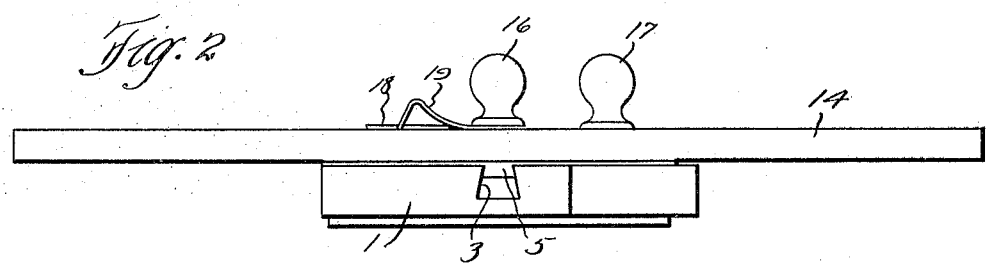
Figure 3:
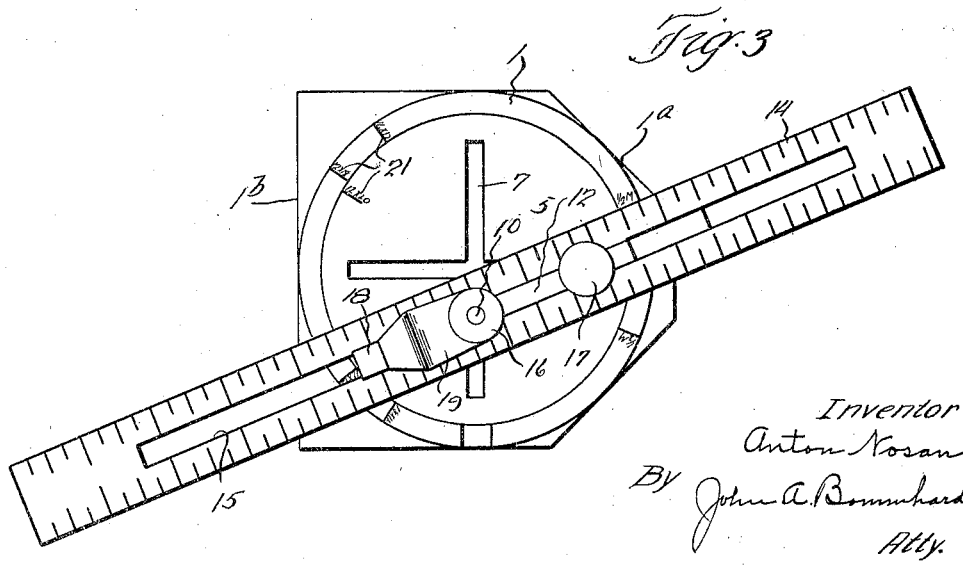

In the drawings Fig. 1 is a plan view of the device showing it set for use as a square or for making mitres; Fig. 2 is a side elevation of Fig. 1; Fig. 3 is a view similar to Fig. 1 showing the device set for indicating a half mitre; Fig. 4 is a plan view of the base with the movable member removed, said movable member being indicated in dot and dash lines in still another position; Fig. 5 is a longitudinal section through Fig. 1 and Fig. 6 is a horizontal section through the base.

The device consists of a base 1 which has two dove-tail grooves 2 and 3 cut therein at a right angle to each other and intersecting at the center of the base. The base is cut out on its upper face as at 4, and has a plate 5 set therein which forms a cover for the crossed grooves 2 and 3, and the plate 5 has slots 6 and 7 therein directly above and in line with the grooves 2 and 3, the slots 6 and 7 being somewhat narrower than the grooves 2 and 3. Blocks 8 and 9 are adapted to slide back and forth in the grooves 2 and 3 and have studs 10 and 11 either carried thereby or screwed into them, the stud 10 being carried by the block 9 and the stund 11 being screwed into the block 8. These studs 10 and 11 are adapted to work in the slots 6 and 7.

A plate 12 is carried by the studs 10 and 11 and it in turn carries a graduated elongated straight edge bar or arm member 14 which is adjustably mounted thereon by the plate 12 extending upwardly in a longitudinal slot 15 in the member 14. The member 14 can be moved lengthwise backwardly and forwardly on the part 12 and is held in the desired position by tightening the nut 16 on the stud 10 and by rotating the stud 11 by the knob 17 thereon.

A catch 18 fits in the slot 15 and is held therein and normally pressed downwardly by a spring 19 which has one end secured beneath the knob 16, and an extension 20 on the lower face of the block is adapted to engage in the slot 6 when the device is used as shown in Fig. 1.

21 indicates angle marks or graduations on the face of the base 1, to which the movable member 14 is set for cutting the desired or corresponding pitches. It is to be understood that there can be any number of graduations placed thereon, only a few being shown in the drawing. It is also to be understood that the device can be graduated for various other uses besides the cutting of pitches.

The base 1 has at one end a pair of angular edges 1ª which extend at an angle say of 45° with the long edges of the bar 14 when the latter is set in its straight position, as shown in Fig. 1, and the other end of the base 1 extends at an angle of 90° across said edges. Accordingly the former edges provide means for indicating an ordinary 45° miter, and the block can be applied to a piece of work to mark or indicate the corresponding angle thereon; and similarly the end 1ᵇ can be used in conjunction with the bar 14 as a square.

By loosening the knobs 16 and 17 the bar 14 can be set at various other angles with respect to the base, the blocks 9 and 10 sliding in the grooves 2 and 3 to positions corresponding to the desired angle. And the crossed grooves permit the bar 14 to be swung around completely, so as to extend in any direction or at any angle with respect to the base, and to be shifted laterally, as with one edge of the bar registering with the center point of the crossed slots as indicated in Fig. 3. So the bar 14 may be used to describe any desired angle. The base 1 for example may be applied against the edge of a piece of work, and the bar may then be set to the angle desired, and used to form a straight edge to scribe a line on the face of the work at a desired angle to the edge.

When the instrument is set in straight position, as shown in Fig. 1, the projection 20 snaps into the groove 6 or 7 and so holds the bar in such position. The various other angular adjustments are permitted by releasing the part 18 and withdrawing the extension 20 from the grooves, so that said extension can wipe over the surface of the plate 5 to permit a desired adjustment. The slot 15 permits any required longitudinal extension of the bar 14 with respect to the base. The trammel action of the blocks 8 and 9 sliding in the crossed grooves gives a two point hold which maintains a desirable rigidity at whatever angle the instrument is set. The combination with the various inclined angles of the base permits a wide variation in the formation of different angles by manipulation of the swinging bar 14.

I claim:

1. A measuring instrument comprising a base having crossed grooves, sliding blocks in the grooves, a swinging bar upon the base, separate pivots connecting the bar and the blocks respectively, and a catch member carried by the bar and engageable in one of said slots to hold the bar at adjustment.

2. A measuring instrument comprising a base having crossed grooves therein, blocks slidable in said grooves, a plate mounted on the base, separate pivots connecting the plate and the respective blocks, and a straight-edge bar slidably mounted on the plate and having a longitudinal slot into which said plate projects to guide the longitudinal movement of the bar.

3. A measuring instrument comprising a base having crossed grooves therein, blocks slidable in said grooves, a plate mounted on the base, separate pivots connecting the plate and the respective blocks, and a straight-edge bar slidably mounted on the plate, and a catch carried by the plate and engageable in a slot to hold the plate at a desired adjustment.

In testimony whereof, I affix my signature in presence of two witnesses.

ANTON NOSAN.

Witnesses:
JOHN A. BOMMHARDT,
G. W. ROSENBERG.